United States Patent Office 3,741,964
Patented June 26, 1973

3,741,964
METHOD FOR PRODUCING AMINO-3,4-DIHYDRO-2H-1,3,5-THIADIAZIN-2-ONES
John P. Chupp, Kirkwood, Mo., assignor to Monsanto Company, St. Louis, Mo.
No Drawing. Filed June 1, 1971, Ser. No. 149,051
Int. Cl. C07d 93/26
U.S. Cl. 260—243 R   7 Claims

ABSTRACT OF THE DISCLOSURE

Novel amino-3,4-dihydro-2H-1,3,5-thiadiazin-2-ones are produced by the reaction of 1-(1-chloro-N-methyl-formamido)-2-methylpropyl isothiocyanate with amines. These amino-3,4-dihydro-2H-1,3,5-thiadiazin-2-ones are useful as herbicides.

---

This invention relates to new and useful amino-3,4-dihydro-2H-1,3,5-thiadiazin-2-ones, to methods for their preparation and to herbicidal composition containing at least one of them. The compounds of this invention are represented by the formula

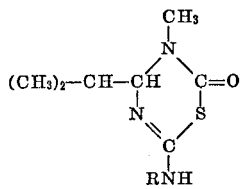

wherein R is hydrogen, a monovalent hydrocarbon radical, or a halogenated aryl group.

Illustrative of the monovalent hydrocarbon radicals which R represents are, for example, alkyl groups containing from 1 to 18 carbon atoms, i.e., methyl, ethyl, propyl, nonyl, octadecyl and the like; aralkyl groups containing from 7 to 12 carbon atoms, such as benzyl, α and β, phenylethyl, phenylpropyl, ethylphenylpropyl, dimethylphenylbutyl, trimethylphenylpropyl and the like; aryl groups containing from 6 to 12 carbon atoms and including alkyl substituted aryl groups such as phenyl, tolyl, xylyl, naphthyl, α-methylnaphthyl, ethylphenyl, diethylphenyl, dipropylphenyl, methylbutylphenyl and the like.

Illustrations of the haloaryl groups represented by R are those containing from 6 to 12 carbon atoms and from 1 to 4 halo substituents, for example, haloaryl groups such as chlorophenyl, bromophenyl, fluorophenyl, 2-bromo-4-methylphenyl, 3-chloro-2,6-dimethylphenyl, 2,4-dichlorophenyl, 2,4,6-trichlorophenyl, 2-bromo-4-chlorophenyl, 2,4-dibromophenyl and the like.

In accordance with the process of this invention the amino-3,4-dihydro-2H-1,3,5-thiadiazin-2-ones of Formula I are produced by the reaction of ammonia or primary amines of the formula $RNH_2$ where R is as previously defined with an isothiocyanate of the formula

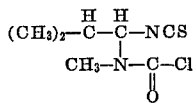

in the presence of a solvent for the reactants and the product at a temperature of from about one solution point of the reactants to the decomposition point of the product.

The temperature at which the process of this invention is conducted is not narrowly critical and can range from as low as −25° C. to as great as 150° C., depending upon the solubility of the reactants in the solvent and the decomposition temperature of the product.

The molar ratio of reactants, i.e., the ammonia or primary amine and isothiocyanate employed in the process of this invention is not narrowly critical and can be from less than 1 to 10 to greater than 10 to 1. It is obvious to those skilled in the art that for best results and yields equal molar amounts of each reactant should be employed.

The process of the present invention is preferably conducted under anhydrous conditions. Small amounts of water can be tolerated, however, water reacts with the carbamoyl chloride causing a loss of yield of the desired product and undesirable side products.

Although a solvent is not necessary in conducting the process of the present invention, for ease of operation and simplicity, it is preferred to employ a solvent. Among the solvents which can be employed in the present process are those solvents which do not contain an active hydrogen or other group which will react with the isothiocyanate or amine starting materials. Such solvent include, for example, methylenechloride, methylene bromide, benzene, toluene, xylene, chloroform, carbontetrachloride, dioxane, tetrahydrofuran, diethylether, the dimethylether of ethylene glycols, the diethylether of diethylene glycol, etc. In as much as the reaction of this invention is exothermic a solvent is also desirable to aid in the dissipation of the heat of reaction.

The process of this invention can be operated at subatmospheric, atmospheric or super-atmospheric pressures. It is preferred, however, for ease of reaction and convenience, to conduct the process of this invention at atmospheric pressure.

The primary amines which are employed in the process of this invention are those of the formula $RNH_2$ when R is as above defined and include for example, ammonia, propyl amine, butyl amine, t-butyl amine, hexyl amine, cyclohexyl amine, nonyl amine, dodecyl amine, octadecyl amine, aniline, benzyl amine, toluidine, xylyl amine, phenylethyl amine, chloroaniline, bromoaniline, and the like.

The (1-chloroalkyl)-alkyl carbamoyl chlorides are prepared by the reaction of N-alkyl-N-alkylidene amines with phosgenes in accordance with the following procedure.

N-methyl-N-isobutylidene imine (0.5 mol, 42.5 g.) was dissolved in benzene and added to ca. 0.55 mol phosgene contained in benzene, at 5–10° C. After all the imine had been added dropwise, the material was refluxed for 1½ hours, with no evidence of appreciable salt formation. The benzene was removed to give clear white liquid which was distilled at B.P. 67–75° C. (1.8 mm.) to give 73 g. (79% yield) of (1-chloro-2-methylpropyl)methylcarbamoyl chloride.

The 1-(1-chloro-N-methylformamido)-alkyl isothiocyanate starting materials employed in producing the compounds of this invention can be produced by the following procedure, which for convenience shows the production of 1-(1-chloro-N-methyl-formamido)-2-methyl propyl isothiocyanate.

1 - chloro - 2 - methyl propylmethylcarbamoyl chloride (18.4 g.) was charged into acetone and cooled to 5° C. Ammonium thiocyanate (7.6 g.) dissolved in acetone was added dropwise. During addition there was continuous precipitation of ammonium chloride. The material was permitted to warm to room temperature, vacuum treated to remove solvent and the residue taken up in ether, washed with water and dried over anhydrous magnesium sulfate. The ether solution was filtered, and the filtrate vacuum evaporated to remove the ether yielding a yellow oil which was identified as 1-(1-chloro-N-methylformamido)-2-methylpropyl isothiocyanate by infrared and magnetic resonance spectral analysis and elemental analysis. Small portions of the oil could be distilled, B.P. 105–110° C. (2 mm.), but larger quantities decomposed upon attempted distillation. The yellow oil can be employed without further purification.

3

The following examples serve to further illustrate the invention. All parts are parts by weight unless otherwise specifically set forth.

EXAMPLE 1

Twenty grams of 1-(1-chloro-N-methylformamido)-2-methylpropyl isothiocyanate was dissolved in methylene chloride and gaseous ammonia bubbled into the solution at room temperature. The ammonia gas was discontinued after it was evident that an excess had been charged as shown by further lack of exothermicity and presence of ammonia in the exit gases by a litmus paper test. The reaction mixture was filtered, the methylene chloride solution washed with water, then dried over anhydrous magnesium sulfate. Upon evaporation of the methylene chloride, and ether trituration of the residue, 12 g. of solid was obtained, M.P. (decomp.) 122–125° C. Recrystallization of the solid from tetrahydrofuran gave white crystals, M.P. (decomp.) 134–135° C. which were identified as 6 - amino - 3,4-dihydro-4-isopropyl-3-methyl-2H - 1,3,5 - thiadiazin - 2 - one by infrared and nuclear magnetic resonance spectral analysis and elemental analysis.

EXAMPLE 2

When methyl amine was substituted for ammonia in Example 1, 3,4 - dihydro - 4 - isopropyl - 3 - methyl-6-(methylamino) - 2H - 1,3,5 - thiadiazin - 2 - one was produced in 35 percent yield. Recrystallization from methylcyclohexane gave crystals which melted with decomposition at 67–75° C.

Other compounds of the invention which are prepared by the substitution of the appropriate amine for ammonia in Example 1 are:

3,4-dihydro-4-isopropyl-3-methyl-6-(ethylamino)-2H-1,3,5-thiazin-2-one
3,4-dihydro-4-isopropyl-3-methyl-6-(butylamino)-2H-1,3,5-thiazin-2-one
3,4-dihydro-4-isopropyl-3-methyl-6-(decylamino)-2H-1,3,5-thiazin-2-one
3,4-dihydro-4-isopropyl-3-methyl-6-(dodecylamino)-2H-1,3,5-thiazin-2-one
3,4-dihydro-4-isopropyl-3-methyl-6-(benzylamino)-2H-1,3,5-thiazin-2-one
3,4-dihydro-4-isopropyl-3-methyl-6-(phenylethylamino)-2H-1,3,5-thiazin-2-one
3,4-dihydro-4-isopropyl-3-methyl-6-(phenylamino)-2H-1,3,5-thiazin-2-one
3,4-dihydro-4-isopropyl-3-methyl-6-(2'-methylphenylamino)-2H-1,3,5-thiazin-2-one The compounds of the present invention show post-emergent herbicidal activity when applied at a rate of from 2 to 25 pounds per acre to growing weed plants such as velvet leaf, lambsquarter and quack grass.

What is claimed is:

1. A compound having the formula

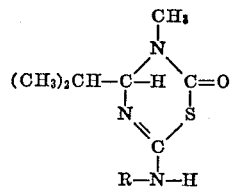

wherein R is hydrogen, a monovalent hydrocarbon radical selected from the class consisting of alkyl groups containing 1 to 18 carbon atoms, aralkyl groups containing from 7 to 12 carbon atoms, aryl groups containing from 6 to 12 carbon atoms, or a haloaryl group containing from 6 to 12 carbon atoms and from 1 to 4 halo substituents.

2. A compound of claim 1 wherein R is alkyl.

3. A compound of claim 1 which is 6-amino-3,4-dihydro-4-isopropyl-3-methyl-2H-1,3,5-thiadiazin-2-one.

4. A compound of claim 1 which is 3,4-dihydro-4-isopropyl - 3 - methyl-6-(methylamino)-2H-1,3,5-thiadiazin-2-one.

5. A process for the preparation of the compounds of claim 1 which comprises reacting an amine of the formula $RNH_2$ wherein R is hydrogen or a monovalent hydrocarbon radical selected from the class consisting of alkyl groups containing 1 to 18 carbon atoms, aralkyl groups containing from 7 to 12 carbon atoms, aryl groups containing from 6 to 12 carbon atoms, or a haloaryl group containing from 6 to 12 carbon atoms and from 1 to 4 halo substituents with an isothiocyanate of the formula

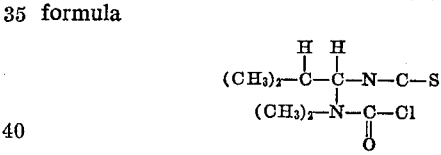

6. The process of claim 5 which is conducted in a solvent.

7. The process of claim 6 wherein the solvent is methylene chloride.

References Cited

UNITED STATES PATENTS 3,217,001    11/1965    Santilli et al. _____ 260—243

JOHN M. FORD, Primary Examiner

U.S. Cl. X.R.

71—90